United States Patent
Copner et al.

(10) Patent No.: US 6,909,511 B2
(45) Date of Patent: Jun. 21, 2005

(54) ATHERMAL INTERFEROMETER

(75) Inventors: Nigel Copner, Fremont, CA (US); Adam D. Cohen, Milford, MA (US); Kim L. Tan, San Jose, CA (US); Christopher John Abraham, Mountain View, CA (US); Feliks Lapinski, Fremont, CA (US)

(73) Assignee: JDS Uniphase Corporation, San Jose, CA (US)

( * ) Notice: Subject to any disclaimer, the term of this patent is extended or adjusted under 35 U.S.C. 154(b) by 333 days.

(21) Appl. No.: 10/082,328

(22) Filed: Feb. 26, 2002

(65) Prior Publication Data

US 2002/0154314 A1 Oct. 24, 2002

Related U.S. Application Data (60) Provisional application No. 60/271,428, filed on Feb. 27, 2001.

(51) Int. Cl.[7] .................... G02B 27/00; G02B 27/14; G01B 9/02
(52) U.S. Cl. .................... 356/519; 359/578; 359/629
(58) Field of Search .................... 356/450, 519; 359/577, 578, 618, 629

(56) References Cited

U.S. PATENT DOCUMENTS

| | | | | |
|---|---|---|---|---|
| 5,982,488 A | * | 11/1999 | Shirasaki | 356/519 |
| 6,275,322 B1 | * | 8/2001 | Tai | 359/279 |
| 6,452,725 B1 | * | 9/2002 | Sterling et al. | 359/577 |

* cited by examiner

Primary Examiner—Gregory J. Toatley, Jr.
Assistant Examiner—Patrick Connolly
(74) Attorney, Agent, or Firm—Lacasse & Associates, LLC; Randy W. Lacasse (57) ABSTRACT

An apparatus is described for controlling the optical path length in an optical device, e.g. an interferometer, and more importantly to maintaining the optical path length difference in an interferometer. The apparatus may include an adjustable plate optically coupled with a beamsplitter. The plate may be rotated such that its surface receives light propagated from the beamsplitter at a non-zero incident angle. In one embodiment, temperature sensitivity is addressed by ensuring that the refractive index of the plate is greater than the refractive index of the beamsplitter. In another embodiment, the apparatus includes combination spacers having a component selected in dependence upon a composition, thickness, and orientation of the adjustable plate.

15 Claims, 8 Drawing Sheets

ATHERMAL INTERFEROMETER

CROSS-REFERENCE TO RELATED APPLICATIONS

The present application claims priority from U.S. patent application Ser. No. 60/271,428 filed Feb. 27, 2001.

TECHNICAL FIELD

This present invention relates to an optical interferometer, and in particular to an athermal optical interferometer useful for filtering signals in optical communication networks.

BACKGROUND OF THE INVENTION

In multiplexed optical communication networks a single optical fiber typically carries multiple independent data channels, with each data channel assigned to a different optical wavelength. Such networks are referred to as wavelength division multiplexed (WDM) networks. As signals propagate through the network, data in different channels may be separated using various kinds of optical frequency filters, e.g. a deinterleaver.

Optical frequency interleavers/deinterleavers are widely recognized as key components enabling the rapid expansion of WDM networks to higher channel counts and narrower channel spacing while preserving inter-channel cross-talk performance, in combination with existing demultiplexer technologies. Because of the periodic frequency nature of the International Telecommunications Union (ITU) grid, interleavers/deinterleavers tend to be constructed from combinations of one or more interferometric structures, e.g. etalons, Mach-Zehnder interferometers, and Michelson interferometers. The desirable features of interleavers/deinterleavers include a flat-topped passband and high isolation in the stop-band.

One form of interleaver/deinterleaver includes a conventional Michelson interferometer (MI). A Michelson interferometer includes a beamsplitter for separating an input optical signal into two component parts and for directing the component parts along separate, perpendicular arms of the device. A reflecting mirror is positioned at the end of each arm for redirecting the components back to the beamsplitter for recombination. This type of interferometer provides a linear phase response, dependent on the optical path difference between the two arms of the interferometer. The linear phase response generates a rounded passband with no chromatic dispersion.

Another form of interleaver/deinterleaver, referred to as a Michelson Gires-Tournois interferometer (MGTI), is a Michelson interferometer in which the mirror of one arm is replaced by a Gires-Tournois (GT) etalon, which is disclosed in U.S. Pat. No. 6,304,689 issued Oct. 16, 2001 to Benjamin Dingel et al. The GT etalon perturbs the linear phase response of the interferometer and produces a non-linear phase response that generates a flat-topped passband that is desired in telecommunication systems.

Yet another form of interleaver/deinterleaver is disclosed in U.S. Pat. No. 6,252,716 issued Jun. 26, 2001 to Reza Paiam, in which both arms of a Michelson interferometer have a GT etalon. A particularly desirable flat top response function is observed when the optical path difference is one half, or multiples of one half, the GT cavity length.

In order to achieve the desired phase condition, the optical path difference must be accurate to within 1 micron. Typically, beamsplitters available for use in interferometers do not provide this kind of accuracy, and therefore create an optical path mismatch because the divided sub-beams do not travel through equal amounts of solid material. Accordingly, phase tuning of the device is provided by the incorporation of a tuning plate in the air gap of one arm of the interferometer. The tuning plate introduces flexibility in the optical path length of one arm of the interferometer by providing a variable amount of glass/air that the beam of light has to pass through. Tuning plates of this type have been disclosed in U.S. Pat. No. 6,275,322 issued Aug. 14, 2001 to Kuochou Tai et al, which is incorporated herein by reference. However, the Tai et al device relates to tuning the optical cavity length of a GT etalon by adjusting a tuning plate inside the etalon cavity. The present invention relates to tuning the optical path difference between the two arms of an interferometer over a wide range of temperatures. According to the present invention, the adjustment of the spectral response to the ITU grid can be accomplished by angle tuning the incident beam of light. In these instances, optimum interference, and hence optimum isolation performance and optimum insertion loss, is observed.

In order for the device to be completely athermal, the amount of glass, or other transparent solid, should be identical in both arms. However, the introduction of a tuning plate also introduces temperature sensitivity. For example, the thickness and refractive index of the tuning plate will generally change with changes in temperature, thus affecting both the optical path length difference and the relative amount of glass, or other transparent solid, in the two arms of the interferometer. In particular, the presence of the tuning plate generally reduces the air gap of the arm accommodating the tuning plate over a range of practical temperatures.

It is an object of the present invention to eliminate any optical path mismatch due to a beamsplitter in an interferometer. It is another object of the present invention to provide an athermal gap for use in optical devices, such as interferometers, to maintain a constant optical path length difference over a practical range of temperatures.

SUMMARY OF THE INVENTION

Accordingly the present invention relates to a device for maintaining a constant air gap between two surfaces comprising:

tuning plate means disposed between the two surfaces for adjusting the optical path length between the two surfaces; and spacer means extending between the two surfaces, which thermally expand by substantially the same amount as the tuning plate means.

Another aspect of the present invention relates to an interferometer comprising:

a first port for launching an input beam of light;

a beamsplitter for splitting the input beam of light into first and second sub-beams, and for directing the first and second sub-beams along first and second optical paths, respectively;

tuning plate means positioned in the first optical path;

a first reflective surface positioned in the first optical path at a desired distance defining a first optical path length, the first reflective surface for redirecting at least a portion of the first sub-beam for interference with the second sub-beam;

fixed plate means positioned in the second optical path;

a second reflective surface positioned in the second optical path at a desired distance defining a second optical path length, the second reflective surface for redirecting at least a portion of the second sub-beam for interference with the first sub-beam forming first and second output beams;

a second port for outputting the first output beam; and a third port for outputting the second output beam;

wherein the tuning plate means is oriented so that the fixed plate means and the tuning plate means ensure a desired optical path length difference between the first and second optical path lengths.

BRIEF DESCRIPTION OF THE DRAWINGS

The present invention is illustrated by way of example, and not by way of limitation, in the figures of the accompanying drawings and in which:

FIG. 5ba illustrates one arm of the interferometer of FIG. 5a;

DETAILED DESCRIPTION

In the following description, numerous specific details are set forth such as examples of specific materials, components, dimensions, etc. in order to provide a thorough understanding of the present invention. It will be apparent; however, to one skilled in the art that these specific details need not be employed to practice the present invention. In other instances, well known materials or methods have not been described in detail in order to avoid unnecessarily obscuring the present invention. Unless otherwise specified, the components discussed herein may be obtained from industry manufacturers such as Research Electro Optics of Boulder, Colo.

Figure 1:
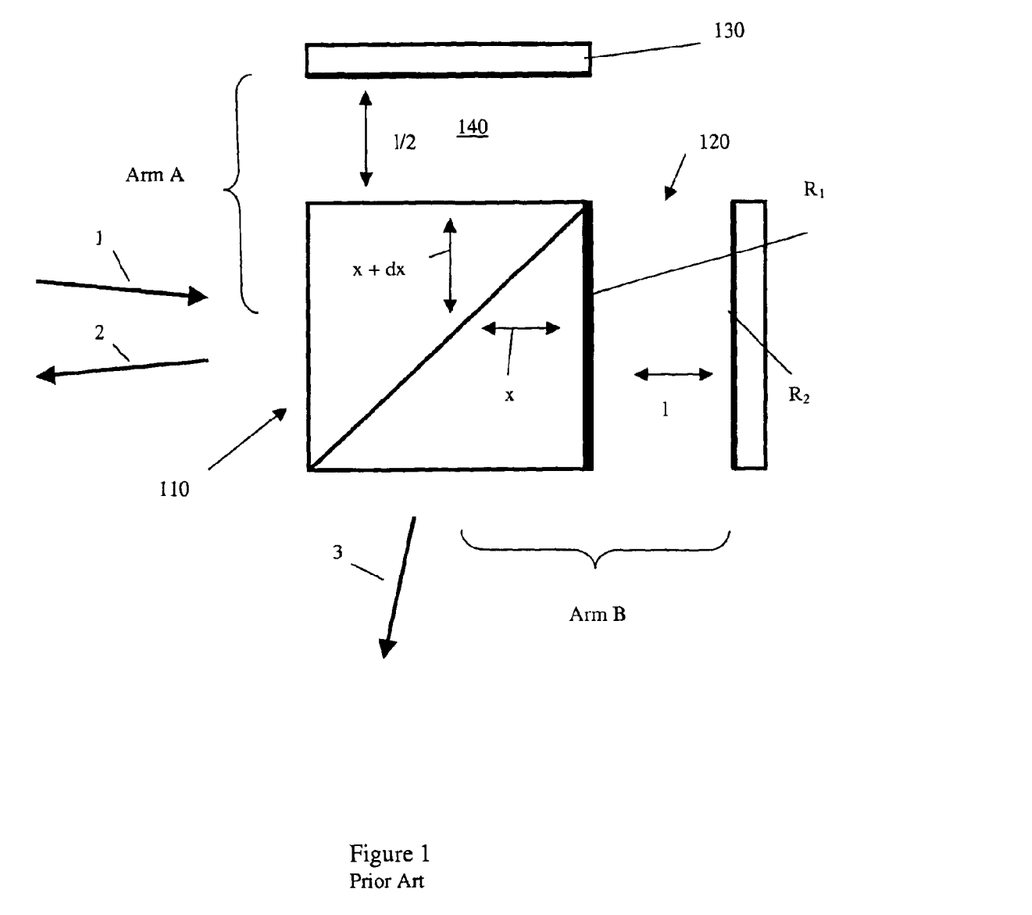
FIG. 1 illustrates a conventional interferometer.

Referring to FIG. 1, a conventional MGTI includes a cubic beamsplitter 110, a highly reflective (95%–100%) reflecting mirror 130, and a GT etalon 120. The GT etalon 120 has a cavity length (l) such that the etalon's free spectral range (FSR) matches the ITU frequency grid. The front reflective surface $R_1$ of the GT etalon 120 can be coated onto a side of the beamsplitter 110, thereby eliminating any air gap in arm B. The mirror 130 is spaced from the beamsplitter 110 by an air gap 140, thereby creating an optical path length difference between arms A and B. The air gap 140 in arm A is preferably set to l/2. An input light beam 1 that is incident on the MGTI is split into two sub-beams of light that propagate separately through arms A and B, respectively, and are reflected back by the mirror 130 and the GT etalon 120. The reflected sub-beams travel back towards the cubic beamsplitter and are coherently added to form output beams 2 and 3.

One problem with the MGTI shown in FIG. 1, is that high precision is required in matching the optical paths in the two halves of the cubic beamsplitter 110, which results in an optical path length mismatch of dx in the beamsplitter 110. While manufacture of the etalon necessarily entails high precision, matching the optical paths in the two halves of a cubic beamsplitter to less than one wavelength is possible, but undesirable owing to the difficulty faced by vendors in manufacturing and the consequent high cost. Typically, an optical path match tolerance in the order of 15–20 $\mu$m is observed for low cost beamsplitters.

Figure 2:
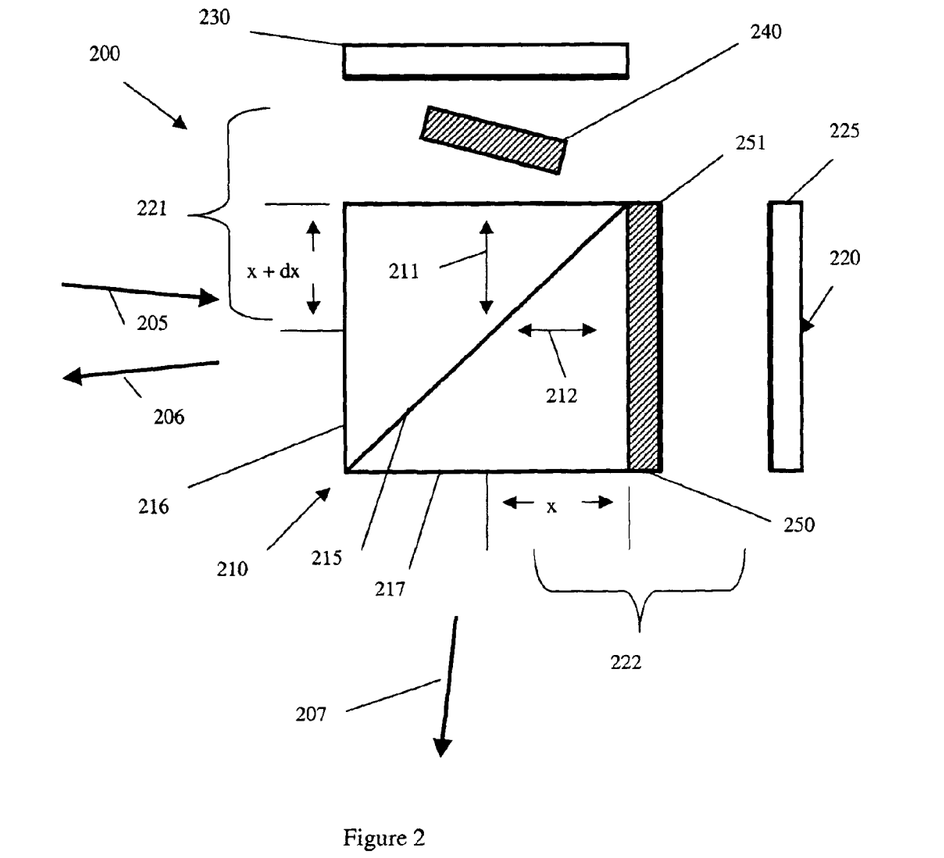
FIG. 2 illustrates one embodiment of an interferometer including a tuning plate in accordance with the instant invention.

FIG. 2 illustrates an embodiment of a MGTI 200 having an adjustable tuning plate 240 in accordance with the instant invention. The interferometer 200 includes a beamsplitter 210, an etalon 220, a mirror 230, the tuning plate 240, and a compensating fixed plate 250. The etalon 220 includes a front partially reflective surface 251 and a back fully reflective surface 225. Preferably, all optical contacting is used. In a preferred embodiment, the mirrors 230 and 225 reflect approximately 100% of light incident upon their surfaces, while the partially reflective surface 251 reflects approximately 15% of incident light. Typically, the mirrors 230 and 225 have a reflectivity of about 90 to 99.9%.

In the illustrated embodiment, the beamsplitter 210 is a cubic beam splitter including a matched pair of right angle prism blocks 216, 217 that are optically coupled together. The hypotenuse of one of the prisms 216, 217 has a partial reflection coating 215. Alternatively, transparent blocks 216 and 217 are physically connected using an epoxy. In alternative embodiments, other types of beamsplitters are used. For example, a plate having appropriate beamsplitter coatings on its surface with the considerations of glass match still fulfilled. Beamsplitters and mirrors are well known in the art; accordingly, a detailed discussion is not provided herein. The beamsplitter 210 may be constructed from fused silica; however, other materials can used, e.g. BK7 material.

Preferably, the tuning plate 240 and the fixed plate 250 are plane parallel plates of transparent material. The tuning plate 240 may be rotated to phase match light beams 212 and 211 propagating through arms 221 and 222, respectively, due to the mismatch δx in the lengths of the prisms of beamsplitter 210 in the direction of light beam travel. In one embodiment, for example, the tuning plate 240 is used to phase match the light beams 212 and 211 to within 5 nanometers (nm) for any given resonance peak.

In operation, an input light beam 205 that is incident on beamsplitter 210 is split substantially equally into beams 211 and 212 whose paths are approximately orthogonal to each other. The beams 211 and 212 propagate separately through a first arm 221 and a second arm 222, respectively. The beam 212 propagates through the fixed plate 250, with a partially reflective coating 251, and is reflected back by the mirror 225 of the etalon 220. The beam 211 propagates through the tuning plate 240 and is reflected back through the tuning plate 240 by the mirror 230. The reflected beams 211 and 212 travel back towards the beamsplitter 210 and are coherently added to form output beams 206 and 207. The input beam 205 can be launched at a non-normal angle to the beam splitter, as shown, in which case the output beam 206 will travel along a path separate from the input beam 205. However, other front-end arrangements are possible, as known in the profession, e.g. input beam 205 is launched normal to the beamsplittter 210 and a circulator is provided for directing the output beam 206. Other front ends are also possible if the interferometer is based on polarization, wherein polarization beam splitters are used to direct orthogonally polarized sub-beams along different paths.

As stated above, in order for the interferometer 200 to achieve optimum interference the optical path lengths in both arms must be matched. However, in order for the interferometer 200 to maintain constant performance over a range of ambient temperatures, the total optical path length of solid material, e.g. glass, through which the light passes must be identical in each arm, i.e. the thickness and the coefficient of thermal expansion (CTE) in one arm must match the thermal expansion in the other arm. Moreover, the change in refractive index with temperature dn/dT must also be matched. Consequently, with a temperature change Δt, the glass in each arm 221, 222 experiences the same thermal expansion and refractive index change, and thus the same modification in optical path length. In other words, if only one type of glass is used, the inter-arm ratio of total optical path length in solids is, and remains with ambient temperature change, 1:1.

Ideally, the combined effects of the coefficient of thermal expansion (CTE), the thermo-optic coefficient (dn/dT), and wavelength dispersion should be considered in an achieving an engineering solution with the best balance of factors.

Consider the simple case of introducing a tuning plate 240 for phase matching, with normal incidence on that plate. If the refractive index of the tuning plate 240 is given by $n_p$, the refractive index of the beamsplitter 210 by $n_b$, and the refractive index of air by $n_a=1$, the thickness d of the tuning plate 240 that needs to be introduced to compensate for the δx beamsplitter mismatch at normal incidence for phase matching is given by:

$$\delta x \, n_b = d(n_p - n_a)$$

or $$d = \frac{n_b}{n_p - 1} \cdot \delta x$$

If the tuning plate 240 and the beamsplitter 210 are of identical low index material, for example fused silica ($n_b$= 1.45), the ratio of d to δx is 3.2. In other words, for a 10 μm mismatch δx in the beamsplitter 210, a tuning plate 240 of 32 μm thickness is required. This may create a large inter-arm mismatch in the total optical path glass thickness (22 μm), thus affecting temperature sensitivity.

In accordance with one aspect of the present invention, this mismatch is reduced and the phase matching is maintained by reducing the $n_b/(n_p-1)$ ratio, e.g. by keeping $n_b$ low and by increasing $n_p$. As such, the material for the tuning plate 240 is selected to have a higher refractive index than the material used for the beamsplitter 210. For example, if the tuning plate 240 is constructed of LaSF18A and the beamsplitter 210 is constructed of fused silica, the ratio is reduced to 1.65 and the glass thickness difference is 6.5 microns (μm). Taking into account CTE and dn/dT parameters, this yields a relative optical path length change of only 11 nm over 70 Kelvins (K) at a fixed wavelength, not including dispersion effects.

In order to achieve a condition of optical path and glass path matching, the tuning plate 240 may be rotated within the air gap of the first arm 221. The effect of a rotation away from the normal incidence condition is to increase the optical path by an amount that, qualitatively, corresponds to the increased path in glass through the tuning plate 240 (due to the oblique incidence) less the reduced air gap through which the light propagates. In one embodiment, the tuning plate 240 is constructed from LaSFN9 available from Schott Glass Technologies Inc., of Duryea, Pa. In alternative embodiments, the tuning plate 240 is constructed from other transparent materials.

In one embodiment, the fixed plate 250 is used to minimize or even eliminate the thermal mismatch in the arms. Referring again to the previous example in which the tuning plate 240 is constructed from a high index material, the fixed plate 250 is also selected from a material having a high refractive index, and its thickness is selected to balance the normal incidence thickness of the tuning plate 240. In other words, the thickness d of the tuning plate 240 may be selected such that for δx=0, the glass path through it at the design angle of incidence equals the thickness of the fixed plate 250 in the second arm 222.

In an alternative embodiment, a rotating plate is used in the second arm 222 with a corresponding fixed plate in the first arm 221. In either case, the beamsplitter 210 is preferably oriented such that the excess glass δx is in the same arm as the tuning plate 240. Accordingly, if the tuning plate 240 is positioned nominally such that light is at a finite angle of incidence, rotation of the tuning plate 240 towards normal incidence results in the net excess high index glass being shifted into the arm having the fixed plate 250.

Figure 3:
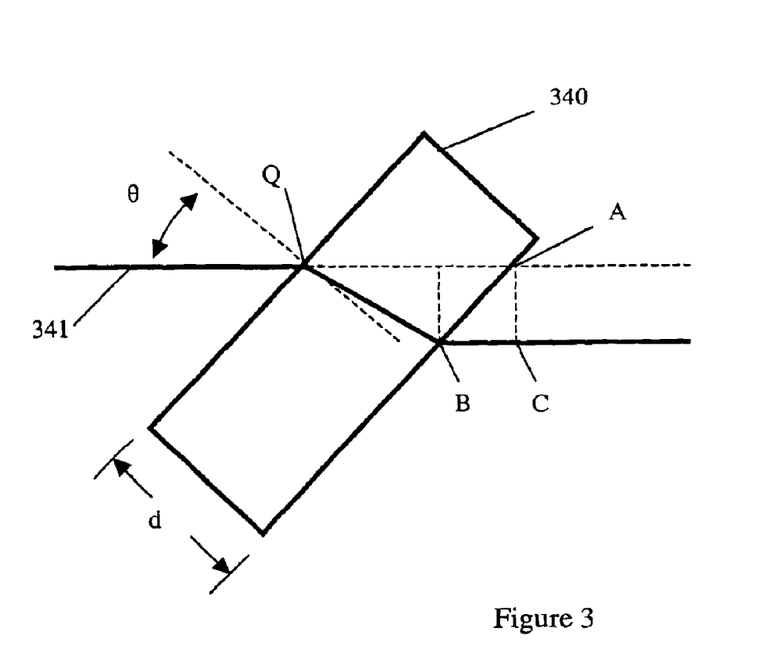
FIG. 3 illustrates the change in optical path created by inserting a tuning plate in an air gap.

FIG. 3 illustrates the change in optical path created by inserting a tuning plate 340 in an air gap. Assuming a single pass through the tuning plate 340, the change Δ(nL) in the optical path 341 created by inserting a plane parallel tuning plate 340 in the air gap, such that light is obliquely incident is given by:

$$n_p(QB) + n_a(BC) - n_a(QA)$$

where Q, A, B, and C are points along the original and altered optical paths relative to the tuning plate 340. Thus, Δ(nL) is given by $$|(n_p^2 - \sin^2\theta)^{1/2} - \cos\theta| \cdot d \quad (1)$$

The rate of change of the optical path 341 as the tuning plate 340 is rotated is given by $$\frac{\partial(OP)}{\partial\theta} = d\sin\theta\left(1 - \cos\theta(n_p^2 - \sin^2\theta)^{1/2}\right) \quad (2)$$

and, for phase match, Δ(OP)Δθ is set to equal nδx.

The rate of change of glass path thickness (single pass) simultaneously incurred is given by $$\frac{\partial(GP)}{\partial\theta} = \frac{d\sin\theta\cos\theta}{n_p^2}\left(1 - \frac{\sin^2\theta}{n_p^2}\right)^{3/2} \quad (3)$$

and, for glass path match Δ(GP)=δx is required.

Dividing (2) and (3) gives $$\frac{\cos\theta\left(1 - \frac{\sin^2\theta}{n_p^2}\right)^{-3/2}}{n_p^2(1 - \cos\theta(n_p^2 - \sin^2\theta)^{-1/2})} = \frac{1}{n_b} = R = 0.69 \text{ for fused silica} \quad (4)$$

Figure 4:
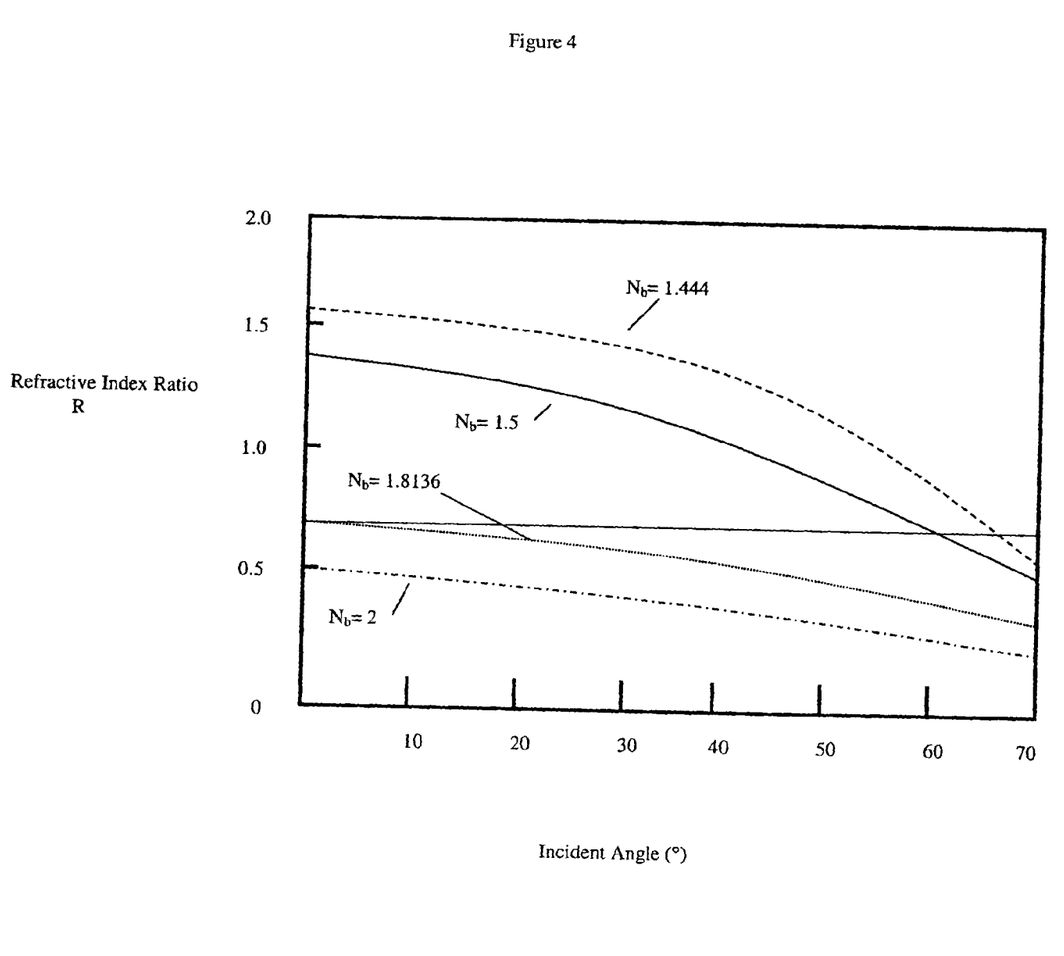
FIG. 4 illustrates plots of a refractive index ratio as a function of incident angle for various plate refractive indices.

Plots of the ratio R (as given in Equation 4) as a function of incident angle for various tuning plate 340 refractive indices $n_p$ is illustrated in FIG. 4. The vertical axis is a refractive index ratio and the horizontal axis is the incident angle of light on the plate. It is apparent from the plots that the use of a tuning plate having a high refractive index, e.g. $n_p$=1.8136, may provide a solution. For different glasses, an exact glass mismatch may not be the correct solution due to the differences in CTE and dn/dT. However, this feature may be optimized by adjusting the relative amount of glass left over depending on the differences in CTE and dn/dT. It should be noted; however, that this value is only to provide scope for interarm cancellation of CTE, dn/dT.

In one embodiment, the design is set such that for δx=0, a matching solution is obtained for a finite (e.g., approximately 10 degrees) incident angle on the plate, with a reduction in angle toward normal incidence or an increase in angle required for matching finite δx. Thus, the sensitivity of the effect (which is linked to the gradient dR/dθ) reduces toward the typically expected approximate 10 μm magnitude of the beamsplitter glass mismatch. In another embodiment, the design is set such that a matching solution is obtained for a normal incidence with an increase in angle away from normal incidence required for matching finite δx. For sensitive uses, a range of tuning plate thickness' may be tested, so that a near normal incidence solution can be obtained.

Owing to the variation of the ratio R with angle of incidence, a precise matching solution is obtained for one δx and corresponding Δθ. Nevertheless, residual glass path mismatch (having achieved phase match) for other δx values is considerably improved over that corresponding to use of a plate where $n_p = n_b$.

This technique allows an efficient means of achieving the desired absolute path difference for phase matching while also balancing the thermal characteristics of the device. The selection of an appropriate high index material (including IR dispersion characteristics) may lead to complete inter-arm balancing over an erbium doped fiber amplifier's (EDFA) C-band and operating temperature range.

Figure 5A:
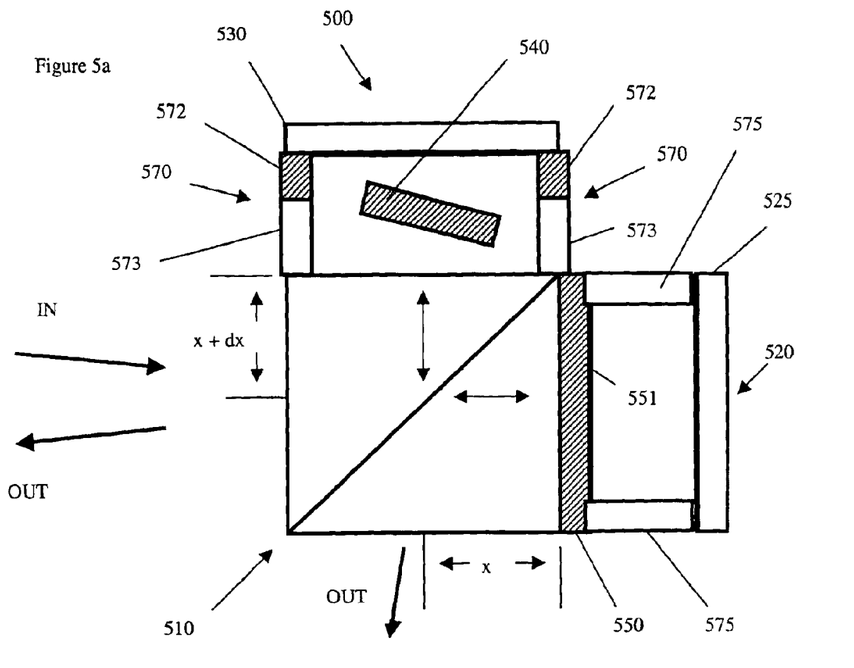
FIG. 5a illustrates an alternative embodiment of an interferometer including a tuning plate in accordance with the instant invention.

FIG. 5a illustrates an alternative embodiment of the present invention, in which an interferometer 500 has an adjustable tuning plate 540 and combination spacers 570. The interferometer 500 includes a beamsplitter 510, an etalon 520, a mirror 530, the adjustable tuning plate 540, a fixed plate 550, the combination spacers 570, and solid spacers 575. The etalon 520 is a GT etalon with a front partially reflective surface 551 and a rear fully reflective mirror 525. The operation of the interferometer 500 is similar to the operation of the interferometer 200 described above in relation to FIG. 2.

The combination spacers 570 are disposed to maintain the air gap between the beamsplitter 510 and the mirror 530, as well as to compensate for any thermal expansion in the arm of the interferometer 500. In one embodiment, the combination spacers 570 are constructed from a first component 572 and a second component 573, with one of the components selected to have a thickness and a CTE to match the expansion of the tuning plate 540, and the other component to provide precise setting of the air gap between the beamsplitter 510 and the mirror 530. For example, if the tuning plate 540 is a 1 mm thick fused silica plate, then the first spacer components 572 may be constructed from fused silica and have a length of 1 mm. Continuing the example, if the air gap in etalon 520 is designed to be 3 mm then the corresponding air gap between the beamsplitter 510 and the mirror 530 is set to be one half that gap, or 1.5 mm, to maintain the ratio of the air gaps as previously discussed. As such, the second spacer components 573 are selected to have a thickness of 1.5 mm. The first spacer component 572 can be made from a different material and have a different length than the tuning plate 540, as long as the first spacer component 572 expands at the same rate as the tuning plate 540, and preferably has a similar dn/dT.

The solid spacers 575 are used to provide the necessary cavity length in the etalon 520. The solid spacers 575 may be constructed of the same material as the second spacer components 573. In one embodiment, the material of the second spacer components 573 and the solid spacers 575 is an ultra low expansion (ULE) material, such as an ultra low expansion glass. ULE materials may be obtained from industry manufacturers such as Corning of Corning, N.Y. and may have, for example, a very low CTE on the order of 10 parts per billion (ppb). In alternative embodiments, the second spacer components 573 and the solid spacers 575 may be constructed from other types of low CTE materials, for example, a glass ceramic such as Zerodur® available from Schott Glass Technologies Inc., of Duryea, Pa. Preferably, the spacer material of the second spacer components 573 and the solid spacers 575 should be matched, or at least have the same sign of CTE. Spacers 570 and 575 need not be constructed of transparent materials since light is not propagated through them.

As previously discussed above in relation to FIG. 2, the tuning plate 540 may be positioned within either arm with the fixed plate 550 correspondingly positioned in the other arm. In either case, the beamsplitter 510 should be oriented such that the excess glass dx is in the same arm as the tuning plate 540. Thus, as the high index tuning plate 540 is rotated, the net excess high index glass is shifted into the arm having the fixed plate 550. The greater differential expansion, after subtracting the effect of the excess fused silica in the arm with the tuning plate 540, is cancelled by the greater differential expansion of the longer spacer (and hence the air gap) in that arm.

Alternatively, an optical bench is used instead of the spacers 570 and 575 to align the components of interferometer 500, and thereby maintain the desired air gap in both arms. In other words, a single spacer is used instead of the pair of spacer 570. The term "air gap" is used to refer to the space between the two surfaces; however, any fluid can be used to fill the space, air being the preferred choice.

Figure 5B:
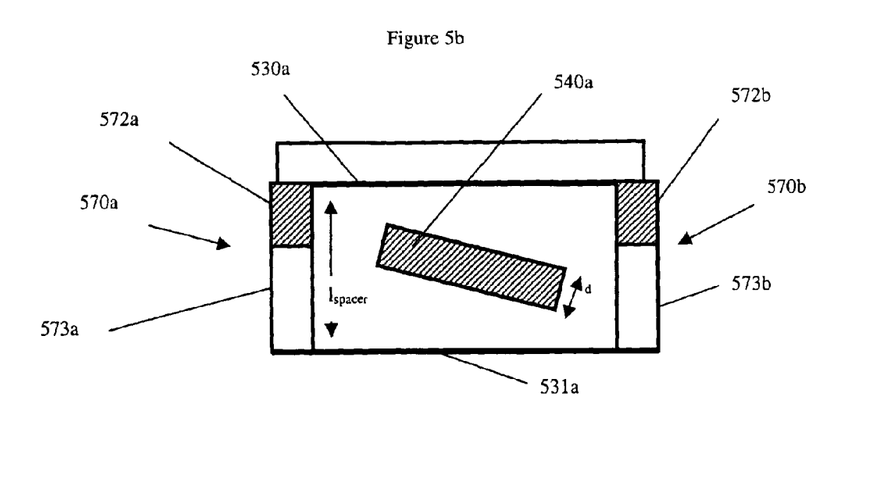

The advantages of the optical arrangement shown in FIG. 5a are discussed further with respect to FIG. 5b. Referring to FIG. 5b, an athermal air gap is shown between the first and second surfaces 530a and 531a. The length of the air gap is substantially equal to the total thickness of the combination spacer 570a ($l_{spacer}$) minus the thickness (d) of a tuning plate 540a. If the combination spacers 570a and 570b are constructed solely from a ULE material, then as the tuning plate 540a expands, for example as a result of increasing temperature, the length of the air gap is reduced. However, if the combination spacers 570a and 570b are constructed of the two component system discussed above, wherein at least the first components 572a and 572b have a thickness and composition selected to match the tuning plate 540a, then the same increase in temperature will simultaneously increase the thickness of both the tuning plate 540a and the combination spacers 570a and 570b, thus maintaining the length of the air gap at a plurality of temperatures. Notably, this optical arrangement provides an athermal air gap that is attractive for interferometers using a tuning plate, as discussed above, but is also suitable for other applications. In most cases it is desirable to construct both of the first components 572a and 572b with exactly the same thickness to prevent any tilting of the mirror; however in cases in which tilting of the mirror is desirable the second components 572a and 572b can be constructed having unequal thickness'. As a result, as the temperature changes, the second component 572a expands more or less than the other second component 572b, and the mirror 530a tilts.

Figure 6:
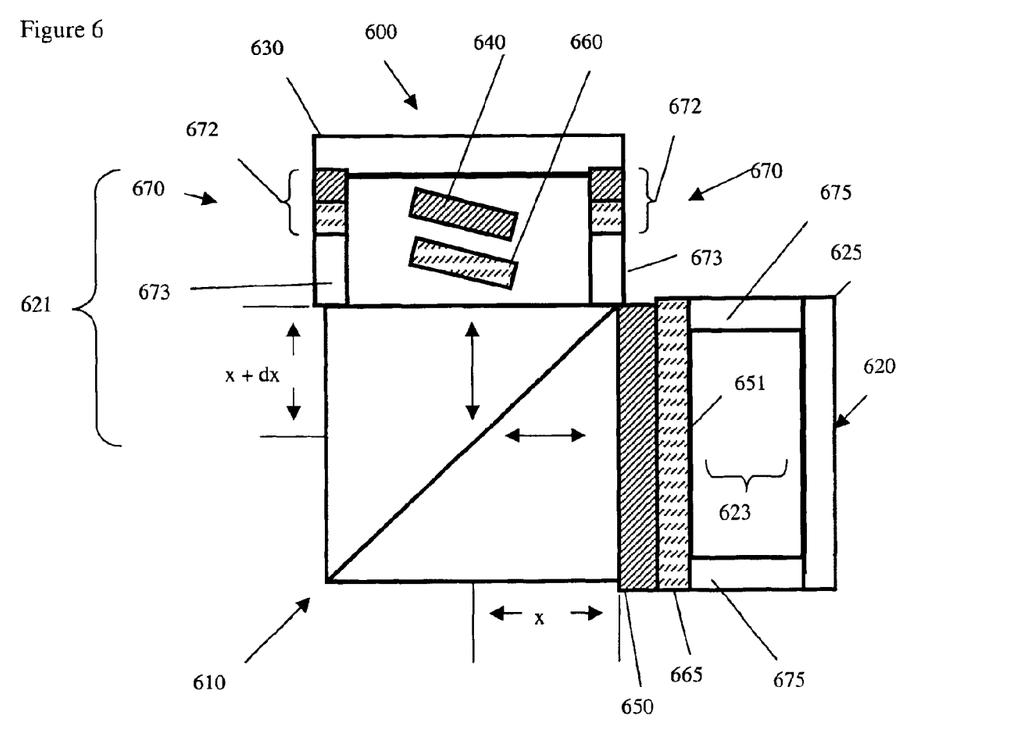
FIG. 6 illustrates another embodiment of an interferometer including two tuning plates in accordance with the instant invention.

FIG. 6 illustrates another embodiment of the present invention, in which an interferometer 600 includes two tuning plates 640 and 660. Interferometer 600 includes a beamsplitter 610, an etalon 620, a mirror 630, a first tuning plate 640, a second tuning plate 660, a first fixed plate 650, a second fixed plate 665, combination spacers 670, and solid spacers 675. Preferably, the second tuning plate 660 has a lower refractive index than the first tuning plate 640, and is also adjustable within the first arm 621 for fine tuning the optical path length. As previously disclosed with reference to FIG. 5, the spacers 670 be constructed from a first component 672 and a second component 673, wherein the first component 672 is constructed from one or more materials selected to match the material of the first and second tuning plates 640 and 660, and wherein the second component 673 is selected to provide for precise setting of the air gap between the beamsplitter 610 and the mirror 630. The simplest method of matching the first component 672 to the first and second tuning plates 640 and 660 is to construct the first component out of first and second elements, which are of the same material and have the same thickness as the first and second tuning plates 640 and 660, respectively. Similarly, the first and second fixed plates 650 and 665 can be constructed out of the same material as the first and second tuning plates 640 and 660; however other combinations are also possible as long as the expansion is matched to reduce the thermal mismatch and the change in refractive index with temperature dn/dT as discussed above in relation to FIG. 2. The etalon 620 is comprised of a partially reflective coating 651 on the fixed plate 665 and the fully reflective mirror 625 separated by the solid spacers 675, defining an etalon cavity 623.

As an example, if the first and second tuning plates 640 and 660 are each 1 mm thick fused silica plates, then the first spacer components 672 may be constructed from fused silica and have a thickness of 2 mm. Continuing the example, if the cavity length 623 in the etalon 620 is designed to be 3 mm then the corresponding air gap between the beamsplitter 610 and the mirror 630 is set to be one half that gap, or 1.5 mm, to maintain the ratio of the air gaps as previously discussed. As such, the second spacer components 673 are selected to have a thickness of 1.5 mm.

In another similar example, the first tuning plate 640 is constructed from a high index material 1 mm thick and the second tuning plate 660 is constructed from a 1 mm thick fused silica plate. Accordingly, the combination spacers 670 have a three part construction corresponding to the first component 672 comprising a first 1 mm element constructed from fused silica and a second 1 mm element constructed from the high index glass, and the second component 673 constructed from a 1.5 mm ULE material. Similarly, the 3 mm cavity 623 in the etalon 620 is separated from the beamsplitter 610 via a 1 mm first fixed plate 650 constructed from the high index glass, and a 1 mm second fixed plate 665 constructed from fused silica.

The operation of interferometer 600 is similar to interferometer 200 described above in relation to FIG. 2. The incorporation of plate 660 is particularly advantageous when the required precision in controlling the angle of plate 640 is at the arc minute level.

Notably, the instant invention is not limited to the MGTI interferometer shown in FIGS. 2 to 6, but is also applicable for other optical arrangements. For example, the invention may include a plate beamsplitter as discussed above and/or may be based on a different interferometer.

Figure 7:
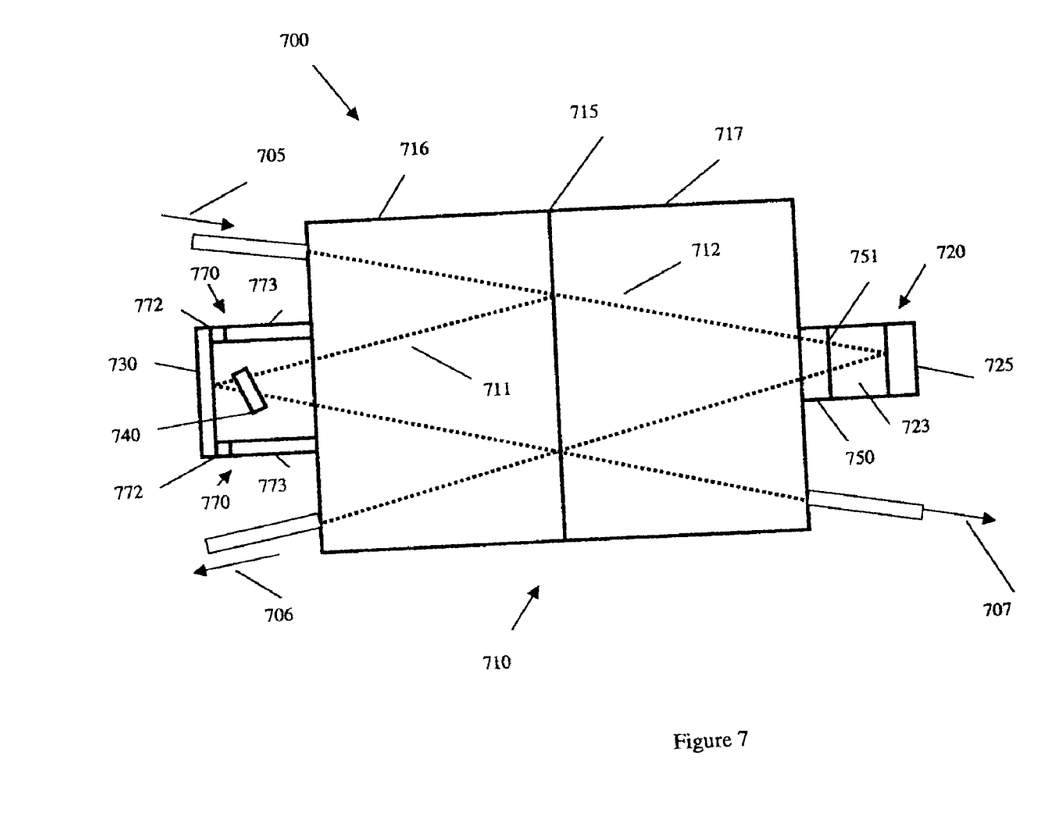
FIG. 7 illustrates yet another embodiment of an interferometer including a tuning plate in accordance with the instant invention.

Referring to FIG. 7, there is shown an alternative embodiment of the present invention, in which an interferometer 700 includes a plate beamsplitter 710 and a tuning plate 740. The interferometer 700 also includes an etalon 720, and a mirror 730. The beamsplitter 710 is a plate beamsplitter including a partially reflective surface 715, a first transparent block 716, and a second transparent block 717. In this case the beamsplitter is constructed out of a pair of rectangular blocks, accordingly, the term "block" should not be limited to only triangular or rectangular, since any shape of block is possible as long as each sub-beam travels through substantially the same amount of solid material. The etalon 720 includes a cavity 723 between a fixed plate 750 and a back mirror 725. In one embodiment, the mirrors 730 and 725 reflect approximately 100% of light incident upon their surfaces, while a partially reflective surface 751 on the fixed plate 750 reflects approximately 1–15% of incident light. The mirror 730 can be separated from the beamsplitter 710 by one or more combination spacers 770, which include first components 772 and second components 773 or, as in FIG. 2, by solid spacers. In the latter case, the interferometer would rely on a high index tuning plate 740 and fixed spacer 750 to ensure athermal behavior.

In operation, an input light beam 705 that is incident on the beamsplitter 710 is split into beams 711 and 712. The beams 711 and 712 propagate separately to the mirror 730, and the etalon 720, respectively. The beam 712 propagates through the fixed plate 750, with partially reflective coating 751, and is reflected back by the back mirror 725 of etalon 720. The beam 711 propagates through the tuning plate 740 and is reflected back through the tuning plate 740 by the mirror 730. The reflected beams 711 and 712 travel back towards partially reflective surface 715 and are coherently added to form output beams 706 and 707.

Figure 8:
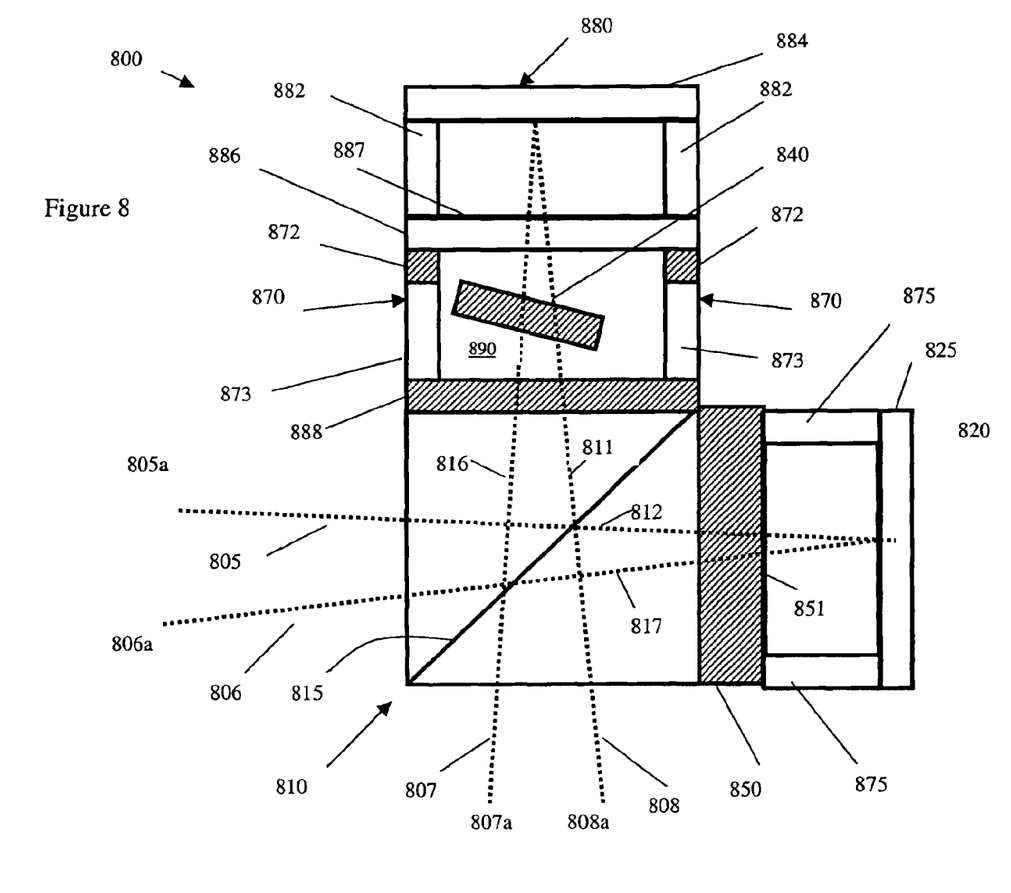
FIG. 8 illustrates yet another embodiment of an interferometer in accordance with the instant invention including four ports.

With reference to FIG. 8, another embodiment of the present invention is illustrated, in which an interferometer 800 includes two GT etalons 820 and 880, along with four input/output ports 805a, 806a, 807a and 808a. The interferometer 800 includes a beamsplitter 810, a first etalon 820, a second etalon 880, and an air space 890 with a tuning plate 840. The first etalon 820 is defined by solid spacers 875 extending between a back mirror 825 and a fixed spacer 850, which has a partially reflective coating 851. The second etalon 880 is defined by solid spacers 882 extending between a back mirror 884 and an intermediate plate 886, which has a partially reflective coating 887. The air space 890 is defined by one or more combination spacers 870 extending between a mounting plate 888 and the intermediate plate 886. The mounting plate 888 facilitates the manufacture of the interferometer 800 by enabling the etalon 880 and the air space 890 to be assembled together and then attached to the beam splitter 810. Accordingly, the fixed spacer 850 must be wide enough to compensate for both the tuning plate 840 and the mounting plate 888. The combination spacers 870 are constructed from first components 872 and second components 873. Preferably, the first component 872 has the same thickness and composition as the tuning plate 840, and the second component 873 is constructed from a ULE material.

In operation, a multiplexed beam of light 805 launched from port 805a, that is incident on beamsplitter 810, is split into first and second sub-beams 811 and 812. The first and second sub-beams 811 and 812 propagate separately to the second etalon 880, and the first etalon 820, respectively. The majority of the second sub-beam 812 propagates through the fixed plate 850 and is reflected back by the back mirror 825. The majority of the second sub-beam 811 propagates through the tuning plate 840, through the intermediate plate 886, and is reflected back through the tuning plate 840 by the back mirror 884. Reflected sub-beams 816 and 817 travel back towards a partially reflective surface 815, at which point they interfere and form sub-beams 806 and 807 for output ports 806a and 807a. As is evident to one skilled in the art, the input beam of light can be launched into any one of the input/output ports 805a to 808a resulting in two sub-beams exiting ports 805a and 808a or 806a and 807a. The aforementioned description is particularly suited for the deinterleaving of a WDM input signal into odd and even ITU channels, assuming the cavity lengths of the first and second etalons 820 and 880 are tuned to the ITU grid. However, the interferometer 800 is also suited for the interleaving of optical wavelength channels. For example, optical wavelength channels input separately into ports 806a and 807a or 805a and 808a can be combined for output one of the other ports.

The four-port design shown in FIG. 8 is particularly advantageous for bi-directional data transfer applications.

The optical arrangements/components described above in relation to FIGS. 2–8 are useful for relaxing the tolerance of an interferometer's beamsplitter. In one embodiment, for example, the optical path matching tolerance δx of the cubic beamsplitter is relaxed from the order of one micron to the order of 15–20 μm, thereby minimizing the manufacturing cost of the cubic beamsplitter. The interferometers discussed above in relation to the figures may be fabricated using bulk optics, planar waveguide circuit (PLC) fiber waveguide, MEMS or other technologies.

In the foregoing specification, the invention has been described with reference to specific exemplary embodiments thereof. It will, however, be evident that various modifications and changes may be made thereto without departing from the broader spirit and scope of the invention as set forth in the appended claims.

We claim:

1. An interferometer comprising:
a first port for launching an input beam of light; a beamsplitter for splitting the input beam of light into first and second sub-beams, and for directing the first and second sub-beams along first and second optical paths, respectively; tuning plate means positioned in the first optical path; a first reflective surface positioned in the first optical path at a desired distance defining a first optical path length, the first reflective surface for redirecting at least a portion of the first sub-beam for interference with the second sub-beam; fixed plate means positioned in the second optical path; a second reflective surface positioned in the second optical path at a desired distance defining a second optical path length, the second reflective surface for redirecting at least a portion of the second sub-beam for interference with the first sub-beam forming first and second output beams;
a second port for outputting the first output beam; and
a third port for outputting the second output beam; wherein the tuning plate means is oriented so that the fixed plate means and the tuning plate means provide a desired optical path length difference between the first and second optical path lengths, wherein the first and second sub-beams pass through an unequal amount of solid material in the beamsplitter creating an optical path mismatch; and wherein the tuning plate means and the fixed plate means are oriented to compensate for the optical path mismatch.

2. The interferometer according to claim 1, wherein the tuning plate means and the fixed plate means are comprised of a material with an index of refraction greater than that of the beamsplitter, thereby enabling the tuning plate means and the fixed plate means to be thin enough, whereby thermal expansion of the tuning plate means and the fixed plate means has no substantial effect on the optical path length difference.

3. An interferometer comprising
a first port for launching an input beam of light; a beamsplitter for splitting the input beam of light into first and second sub-beams, and for directing the first and second sub-beams along first and second optical path, respectively; tuning plate means positioned in the first optical path; a first reflective surface positioned in the first optical path at a desired distance defining a first optical path length, the first reflective surface for redirecting at least a portion of the first sub-beam for interference with the second sub-beam; fixed plate means positioned in the second optical path; a second reflective surface positioned in the second optical path at a desired distance defining a second optical path length, the second reflective surface for redirecting at least a portion of the second sub-beam for interference with the first sub-beam forming first and second output beams;
a second port for outputting the first output beam; and
a third port for outputting the second output beam; wherein the tuning plate means is oriented so that the fixed plate means and the tuning plate means provide a desired optical path length difference between the first and second optical path lengths, wherein the first reflective surface is separated from the beamsplitter by spacer means that thermally expand by substantially the same amount as the tuning plate means, whereby, including expansion of the fixed plate means, the optical path length difference does not substantially change over a practical range of temperatures; and wherein said spacer means defines a gap within which the tuning plate means is positioned.

4. The interferometer according to claim 3, wherein each spacer means is comprised of a first component having a thickness and a coefficient of thermal expansion selected to match the thermal expansion of the tuning plate means, and a second component having a relatively low coefficient of thermal expansion selected to provide substantially no thermal expansion.

5. The interferometer according to claim 4, wherein the first component has substantially the same thickness and substantially the same coefficient of thermal expansion as the tuning plate means.

6. The interferometer according to claim 5, wherein the tuning plate means and the fixed plate means are constructed from substantially the same material and have substantially the same thickness between respective, parallel, front and back faces; and wherein the tuning plate is oriented to receive the first sub-beam at a non-normal angle to the front face.

7. The interferometer according to claim 3, wherein the tuning plate means comprises a first tuning plate and a second tuning plate, wherein the second tuning plate has a different refractive index than the first tuning plate.

8. The interferometer according to claim 7, wherein the fixed plate means comprises a first fixed plate and a second fixed plate; wherein the first fixed plate has substantially the same refractive index as the first tuning plate, and the second fixed plate has substantially the same refractive index as the second tuning plate.

9. The interferometer according to claim 7, wherein each spacer means is comprised of a first component having a thickness and a coefficient thermal expansion selected to substantially match the thermal expansion of the first tuning plate; a second component having a thickness and a coefficient of thermal expansion selected substantially match the thermal expansion of the second tuning plate; and a third component having a relatively low coefficient of thermal expansion selected to ensure substantially no thermal expansion thereof.

10. The interferometer according to claim 3, further comprising a mounting plate optically coupled to the beamsplitter in the first optical path, whereby the spacer means extend therefrom; wherein the fixed plate means has a thickness and a coefficient of thermal expansion selected to substantially match the combined expansion of the tuning plate means and the mounting plate to ensure the optical path length difference remains constant over a practical range of temperatures.

11. An interferometer comprising:
   a first port for launching an input beam of light; a beamsplitter comprising first and second transparent blocks with a partially reflective surface therebetween, for splitting the input beam of light into first and second sub-beams, and for directing the first and second sub-beams along first and second optical paths through the first and second transparent blocks, respectively, said first and second sub-beams traveling through an unequal amount of solid transparent block causing an optical path mismatch;
   a first reflective surface positioned in the first optical path at a desired distance from the separation point defining a first optical path length, the first reflective surface for redirecting at least a portion of the first sub-beam for interference with the second sub-beam;
   spacer means defining a gap between the first transparent block and the first reflective surface; tuning plate means positioned in the first optical path within the gap;
   a second reflective surface positioned in the second optical path at a desired distance from the separation point defining a second optical path length, the second reflective surface for redirecting at least a portion of the second sub-beam for interference with the first sub-beam forming first and second output beams;
   fixed plate means positioned in the second optical path between the second transparent block and the second reflective surface;
   a second port for outputting the first output beam; and
   a third port for outputting the second output beam;
   wherein the tuning plate means is oriented so that the fixed plate means and the tuning plate means compensate for the optical path mismatch; and
   wherein thermal expansion of the spacer means compensates for thermal expansion of the tuning plate means, which along with thermal expansion of the fixed plate means ensure that a desired optical path length difference between the first and second optical path lengths does not change over a practical range of temperatures.

12. The interferometer according to claim 11, wherein the tuning plate means comprises a first tuning plate and a second tuning plate, wherein the first tuning plate has a refractive index different than that of the second tuning plate.

13. The interferometer according to claim 12, wherein the fixed plate means comprises a first fixed plate and a second fixed plate; and wherein the first fixed plate is constructed out of substantially the same material as the first tuning plate, and the second fixed plate is constructed out of substantially the same material as the second uning plate.

14. The interferometer according to claim 13, wherein each spacer means is comprised of a first component constructed out of substantially the same material as the first tuning plate; a second component constructed out of substantially the same material as the second tuning plate; and a third component having a relatively low coefficient of thermal expansion selected to ensure substantially no thermal expansion thereof.

15. The interferometer according to claim 11, further comprising a mounting plate optically coupled to the beamsplitter in the first optical path, whereby the spacer means extend therefrom; wherein each spacer means is comprised of a first component constructed out of the substantially the same material as the first tuning plate, and a second component having a relatively low coefficient of thermal expansion selected to ensure substantially no thermal expansion thereof; and wherein the fixed plate means and the mounting plate are constructed out of substantially the same material as the tuning plate means.

* * * * *